United States Patent
Gaither

(10) Patent No.: US 10,293,808 B2
(45) Date of Patent: May 21, 2019

(54) CONSTANT POWER CONTROL

(71) Applicant: Toyota Motor Engineering & Manufacturing North America, Inc., Erlanger, KY (US)

(72) Inventor: Geoffrey D. Gaither, Brighton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 242 days.

(21) Appl. No.: 15/449,490

(22) Filed: Mar. 3, 2017

(65) Prior Publication Data

US 2018/0251118 A1  Sep. 6, 2018

(51) Int. Cl.
*B60W 20/15* (2016.01)
*F02D 29/06* (2006.01)
(Continued)

(52) U.S. Cl.
CPC .............. *B60W 20/15* (2016.01); *B60L 7/10* (2013.01); *B60W 10/06* (2013.01); *B60W 10/08* (2013.01); *B60W 30/143* (2013.01); *F02D 29/02* (2013.01); *F02D 29/06* (2013.01); *F02D 41/021* (2013.01); *B60W 2510/0666* (2013.01); *B60W 2520/10* (2013.01); *B60W 2540/10* (2013.01);
(Continued)

(58) Field of Classification Search
CPC ...... B60W 20/15; B60W 10/06; B60W 10/08; B60W 30/143; B60W 2510/0666; B60W 2520/10; B60W 2540/10; B60W 2540/12; B60W 2710/0677; B60W 2710/086; B60W 2710/305; B60W 2720/10; B60L 7/10; F02D 29/02; F02D 29/06; F02D 41/021; F02D 2200/501; F02D 2200/604; F02D 2200/702; B60Y 2300/143; B60Y 2400/112; Y10S 903/93

See application file for complete search history.

(56) References Cited

U.S. PATENT DOCUMENTS 6,209,672 B1  4/2001  Severinksy
6,232,744 B1  5/2001  Kawai et al.
(Continued)

FOREIGN PATENT DOCUMENTS

WO  WO 2014027152  2/2014
WO  WO 2014154764  10/2014

*Primary Examiner* — Thomas G Black
*Assistant Examiner* — Sze-Hon Kong
(74) *Attorney, Agent, or Firm* — Snell & Wilmer LLP

(57) ABSTRACT

A system for increasing fuel efficiency of a vehicle includes a power source designed to convert a fuel into power and an input device designed to receive user input corresponding to a request to operate in a constant power mode. The system further includes at least one sensor designed to detect vehicle data corresponding to a current power of the power source and a memory designed to store an upper power threshold and a lower power threshold. The system further includes an electronic control unit (ECU) that is designed to determine the current power of the power source based on the detected vehicle data and to control the power source such that the current power remains between the upper power threshold and the lower power threshold when the user input corresponds to the request to operate in the constant power mode.

17 Claims, 9 Drawing Sheets

(51) Int. Cl.
  *B60W 10/06* (2006.01)
  *B60W 10/08* (2006.01)
  *B60W 30/14* (2006.01)
  *B60L 7/10* (2006.01)
  *F02D 41/02* (2006.01)
  *F02D 29/02* (2006.01)

(52) U.S. Cl.
  CPC ... *B60W 2540/12* (2013.01); *B60W 2550/142* (2013.01); *B60W 2710/0677* (2013.01); *B60W 2710/086* (2013.01); *B60W 2710/305* (2013.01); *B60W 2720/10* (2013.01); *B60Y 2300/143* (2013.01); *B60Y 2400/112* (2013.01); *F02D 2200/501* (2013.01); *F02D 2200/604* (2013.01); *F02D 2200/702* (2013.01); *Y10S 903/93* (2013.01)

(56) References Cited

U.S. PATENT DOCUMENTS

| | | | |
|---|---|---|---|
| 6,329,775 B1* | 12/2001 | Matsubara | B60K 6/485 318/376 |
| 6,455,947 B1 | 9/2002 | Lilley et al. | |
| 7,223,200 B2 | 5/2007 | Kojima et al. | |
| 7,832,510 B2 | 11/2010 | Hoshiba et al. | |
| 8,122,985 B2 | 2/2012 | Nagashima et al. | |
| 8,485,291 B2 | 7/2013 | O'Neill | |
| 8,486,571 B2 | 7/2013 | Choi et al. | |
| 8,738,255 B2 | 5/2014 | Carter et al. | |
| 9,278,694 B2 | 3/2016 | Plant et al. | |
| 9,481,371 B2 | 11/2016 | Park | |
| 9,738,268 B1* | 8/2017 | Zhang | B60W 20/13 |
| 10,017,174 B2* | 7/2018 | Wang | B60W 10/06 |
| 2008/0269011 A1* | 10/2008 | Sopko | B60K 6/46 477/34 |
| 2008/0314658 A1* | 12/2008 | Atarashi | B60K 6/445 180/65.25 |
| 2009/0212626 A1* | 8/2009 | Snyder | B60K 6/448 307/10.1 |
| 2009/0242301 A1* | 10/2009 | McClanahan | B60K 5/08 180/69.6 |
| 2010/0018784 A1 | 1/2010 | Hoebel | |
| 2010/0038158 A1* | 2/2010 | Whitney | B60K 6/365 180/65.265 |
| 2010/0332100 A1* | 12/2010 | Faggetter | B60K 31/00 701/93 |
| 2011/0125294 A1* | 5/2011 | Yu | B60K 6/48 700/33 |
| 2011/0307130 A1* | 12/2011 | Gow | B60G 17/0195 701/22 |
| 2014/0297087 A1* | 10/2014 | Amano | B60L 11/123 701/22 |
| 2014/0316626 A1* | 10/2014 | Amano | B60L 11/123 701/22 |
| 2014/0330462 A1 | 11/2014 | Wada et al. | |
| 2015/0021916 A1* | 1/2015 | Amano | B60K 6/445 290/45 |
| 2015/0158483 A1* | 6/2015 | Dalum | B60W 20/10 701/22 |
| 2015/0222208 A1* | 8/2015 | Hisano | B60L 7/14 318/376 |
| 2016/0001659 A1* | 1/2016 | Huh | B60L 7/18 701/70 |
| 2016/0001764 A1* | 1/2016 | Iwase | B60K 6/445 701/22 |
| 2016/0214611 A1* | 7/2016 | Neaves | F02D 29/02 |
| 2016/0297435 A1* | 10/2016 | D'Amato | B60W 30/143 |
| 2017/0158194 A1* | 6/2017 | Leisenring | F02D 41/029 |
| 2017/0174220 A1* | 6/2017 | Puri | B60W 30/19 |
| 2017/0197611 A1* | 7/2017 | Yamazaki | B60W 20/13 |
| 2017/0334427 A1* | 11/2017 | Butcher | B60K 6/48 |
| 2018/0057004 A1* | 3/2018 | Muldoon | B60W 10/06 |
| 2018/0134296 A1* | 5/2018 | Oh | B60W 30/143 |
| 2018/0194351 A1* | 7/2018 | Haupts | B60W 30/143 |

* cited by examiner

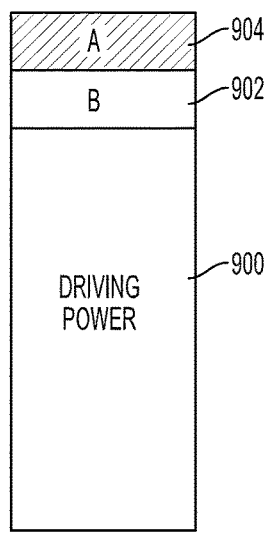
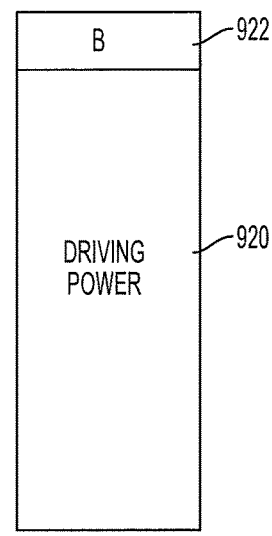
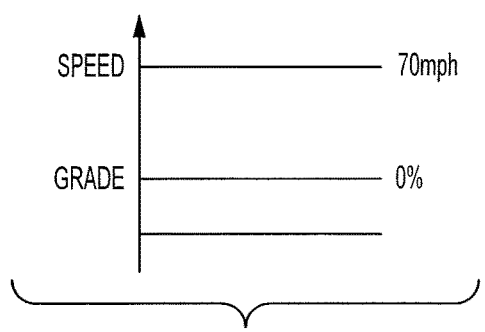
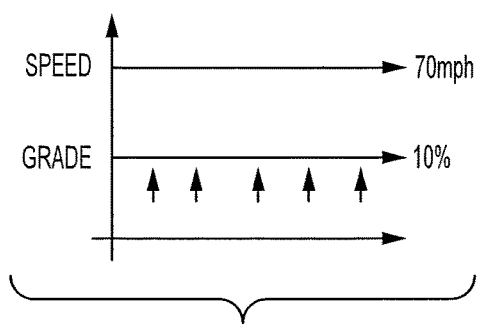
FIG. 9A
FIG. 9B

CONSTANT POWER CONTROL

BACKGROUND

1. Field

The present disclosure relates to systems and methods for improving fuel efficiency of a vehicle by controlling the vehicle to operate with a constant power output.

2. Description of the Related Art

As time goes on, increased vehicle fuel efficiency (i.e., miles per gallon (mpg) or kilometers per liter) is becoming more desirable. Relatively high fuel efficiency is advantageous for several reasons. For example, improved fuel efficiency reduces pollutants output by the vehicle in the form of exhaust. Similarly, improved fuel efficiency reduces a total cost of driving the vehicle because the vehicle will require less fuel per unit of distance traveled. This may be especially desirable during times in which oil prices are relatively high.

Various measures have been implemented in attempts to increase fuel efficiency. For example, hybrid vehicles are now being produced that function using both an engine and a motor-generator. The motor-generator may recapture energy at certain times, such as during vehicle braking and downhill coasting. The recaptured energy may be stored in a battery and later used by the motor-generator to provide additional propulsion power. Cruise control systems may further increase fuel efficiency as they cause the vehicle to remain at a relatively constant speed instead of being unnecessarily accelerated by the driver. However, competition between vehicle manufacturers and an increasing number of regulations are forcing manufacturers to continue to increase the fuel efficiency of their vehicles.

Accordingly, further improvements for increasing fuel efficiency of traditional and hybrid vehicles are desired.

SUMMARY

Described herein is a system for increasing fuel efficiency of a vehicle. The system includes a power source designed to convert a fuel into power. The system further includes an input device designed to receive user input corresponding to a request to operate in a constant power mode. The system further includes at least one sensor designed to detect vehicle data corresponding to a current power of the power source. The system further includes a memory designed to store an upper power threshold and a lower power threshold. The system further includes an electronic control unit (ECU) coupled to the power source, the input device, the at least one sensor, and the memory. The ECU is designed to determine the current power of the power source based on the detected vehicle data and to control the power source such that the current power remains between the upper power threshold and the lower power threshold when the user input corresponds to the request to operate in the constant power mode.

Also described is a system for increasing fuel efficiency of a vehicle. The system includes an engine designed to convert a fuel into engine power. The system further includes a battery designed to store electrical energy. The system also includes a motor-generator coupled to the battery and designed to convert the electrical energy into motor power. The system also includes an input device designed to receive user input corresponding to a request to operate in a constant power mode. The system further includes at least one sensor designed to detect vehicle data corresponding to a current engine power of the engine. The system further includes a memory designed to store an upper engine power threshold and a lower engine power threshold. The system further includes an electronic control unit (ECU) coupled to the engine, the motor-generator, the input device, the at least one sensor, and the memory. The ECU is designed to determine the current engine power based on the detected vehicle data and to control the engine such that the current engine power remains between the upper engine power threshold and the lower engine power threshold when the user input corresponds to the request to operate in the constant power mode.

Also described is a method for increasing fuel efficiency of a vehicle. The method includes converting, by a power source, a fuel into power. The method further includes receiving, by an input device, user input corresponding to a request to operate in a constant power mode. The method further includes detecting, by at least one sensor, vehicle data corresponding to a current power of the power source. The method further includes storing, in a memory, an upper power threshold and a lower power threshold. The method further includes determining, by an electronic control unit (ECU), the current power of the power source based on the detected vehicle data. The method further includes controlling, by the ECU, the power source to generate power between the upper power threshold and the lower power threshold when the user input corresponds to the request to operate in the constant power mode.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIGS. 9A and 9B are charts illustrating transfer of power from nonessential auxiliary components to driving power when a vehicle speed decreases to or below a lower threshold vehicle speed according to an embodiment of the present invention.

DETAILED DESCRIPTION

The present disclosure describes a system and a method for providing increased vehicle fuel efficiency. An exemplary system includes a power source, such as an engine or a combination of an engine and a motor-generator, for converting fuel into power. An input device of the system is designed to receive user input corresponding to a request for the vehicle to operate in a constant power mode. One or more sensor of the system is designed to detect data corresponding to a current power output of the power source. The system includes an electronic control unit (ECU) that is designed to determine a desired power of the power source and to control the power source to constantly output power that is within an upper power threshold and a lower power threshold that correspond to the desired power.

The system provides several benefits and advantages. Fuel efficiency of engines decreases when the engine power is allowed relatively large fluctuations, and thus fuel efficiency is typically maximized when the power output is relatively constant. Accordingly, by controlling the engine power to remain between an upper power threshold and a lower power threshold, fuel efficiency is maximized. Controlling the engine power to remain between the upper power threshold and the lower power threshold is advantageous because it allows the power to increase to the upper power threshold (i.e., increasing the vehicle speed) when the vehicle speed decreases (such as when the vehicle is traveling uphill). Furthermore, this allows the power to decrease to the lower power threshold (i.e., decreasing the vehicle speed) when the vehicle speed increases (such as when the vehicle is traveling downhill). The system may further cause one or more auxiliary device to stop receiving power from the power source when the vehicle speed decreases, advantageously allowing the power to be used to increase the vehicle speed.

Figure 1:
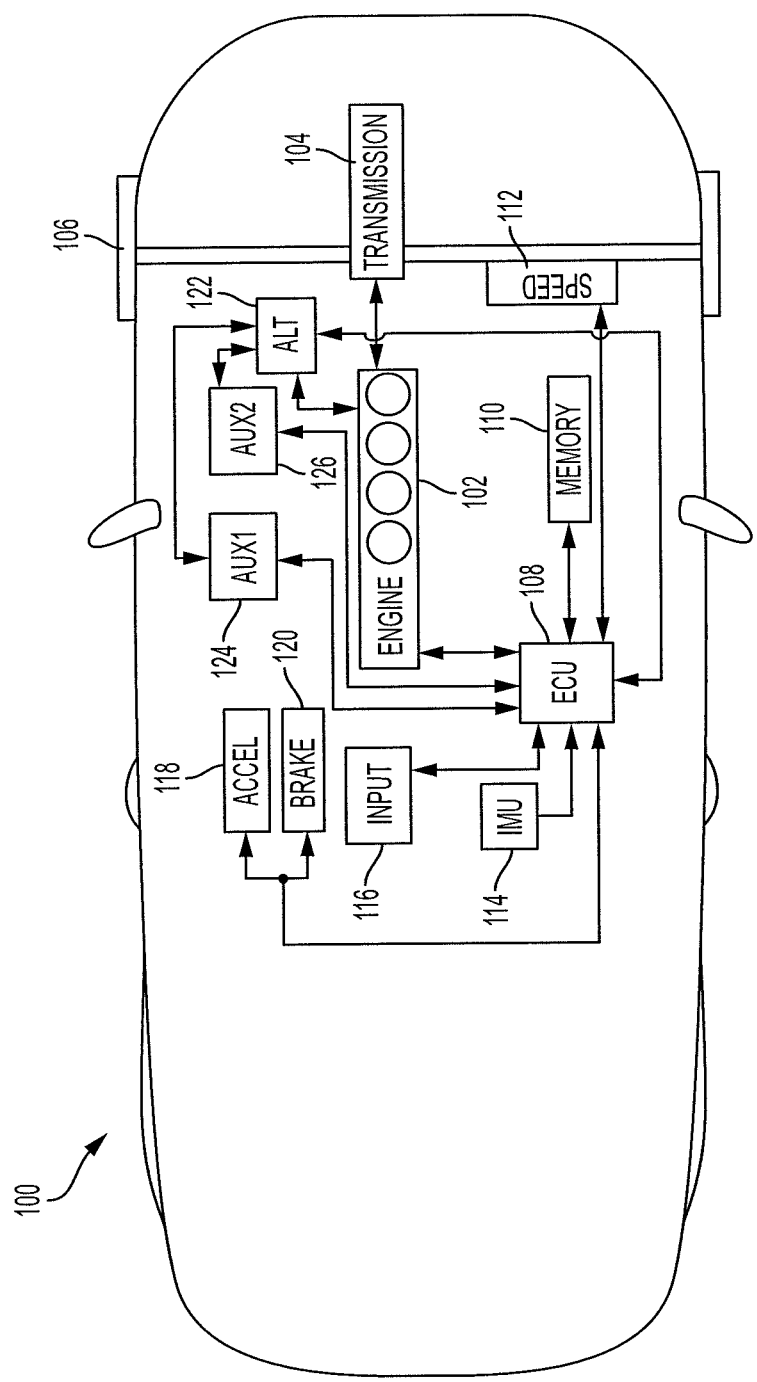
FIG. 1 is a drawing of a vehicle having various features for operating in a constant power mode to increase fuel efficiency according to an embodiment of the present invention.

Turning to FIG. 1, a vehicle 100 is shown. The vehicle 100 may include features for providing improved fuel economy. In particular, the vehicle 100 may include an engine 102, a transmission 104, wheels 106, ECU 108, and a memory 110.

The engine 102 may convert a fuel into mechanical power, such as torque. The engine may include a gasoline engine, a fuel cell engine, or any other type of engine capable of converting a fuel into mechanical power.

The transmission 104 may be coupled to the engine 102 and may transfer the mechanical power output by the engine 102 to the wheels 106. The wheels 106 may rotate in response to receiving the mechanical power, thus propelling the vehicle 100 in a desired direction.

The ECU 108 may include a logic device, such as a processor, a microprocessor, a FPGA, or the like, that is specifically designed to perform functions that correspond to operations of the vehicle 100. The memory 110 may include any non-transitory memory capable of storing data. For example, the memory 110 may store instructions to be performed by the ECU 108, may store data usable by the ECU 108 to control operation of the vehicle 100, or the like.

The vehicle 100 may further include one or more sensor capable of detecting data usable by the ECU 108 to determine certain information. For example, the data detected by the one or more sensor may be usable by the ECU 108 to determine a speed of the vehicle, a current power output by the engine 102, or the like. In particular, the one or more sensor of the vehicle 100 may include a speed sensor 112 and an inertial measurement unit (IMU) 114.

The speed sensor 112 may be coupled to the wheels 106 and be capable of detecting an angular velocity of the wheels 106. In some embodiments, the speed sensor 112 may be coupled to another component of the vehicle 100 and capable of detecting a vehicle ground speed.

The ECU 108 may receive the detected angular velocity of the wheels 106 and convert the angular velocity into a vehicle speed. The IMU 114 may include a gyroscope, accelerometer, or other inertial measurement sensor capable of detecting inertial measurement data corresponding to inertial measurement of the vehicle 100. For example, the IMU 114 may detect an orientation of the vehicle 100 (whether the vehicle is traveling uphill or downhill and to what degree), a vehicle speed, a rate of acceleration of the vehicle 100, or the like. The vehicle 100 may further include any additional or alternative sensors without departing from the scope of the present disclosure.

The vehicle 100 may further include an input device 116. The input device 116 may include any device capable of receiving user input. For example, the input device 116 may include a button, a knob, a dial, a touchscreen, or the like. The input device 116 may receive user input such as a request for the vehicle 100 to operate in one of multiple fuel economy modes.

The vehicle 100 may further include an acceleration pedal 118 and a brake pedal 120. The acceleration pedal 118 may receive user input corresponding to a desired acceleration of the vehicle 100. As the acceleration pedal 118 is depressed by a driver, the ECU 108 may determine the percentage of acceleration requested by the driver. For example, if the acceleration pedal 118 is depressed by 25 percent (25%) then the ECU 108 may determine that the driver is requesting 25% of the total acceleration power of the vehicle 100. In that regard, the ECU 108 may control the engine 102 to generate an amount of power that corresponds to 25% of the maximum acceleration rate, for example by adjusting an amount of air and/or fuel provided to the engine 102.

The brake pedal 120 may receive user input corresponding to a desired braking request of the vehicle 100. As the brake pedal 120 is depressed by a driver, the ECU 108 may determine an amount of braking requested by the driver. The ECU 108 may control a brake (not shown) to decelerate the vehicle 100 based on the requested amount of braking.

The vehicle 100 may further include an alternator 122. The alternator 122 may be coupled to the engine 102 and may convert mechanical power from the engine 102 into electrical power usable by one or more auxiliary component of the vehicle 100.

The vehicle 100 may further include a plurality of auxiliary components including a first auxiliary component 124 and a second auxiliary component 126. Each of the auxiliary components 124, 126 may include any component of the vehicle 100 that does not supply power to the wheels 106. For example, the first auxiliary component 124 and/or the second auxiliary component 126 may include one or more of a climate control unit capable of cooling or heating a cabin of the vehicle 100, an entertainment unit capable of outputting audio and/or video, heated seats, a heated steering wheel, or the like.

The vehicle 100 may be capable of operating in a constant power mode in which the engine 102 continuously outputs a relatively constant amount of power. The vehicle 100 may operate in the constant power mode in response to receiving user input at the input device 116 corresponding to such a request. In order for the vehicle 100 to operate in the constant power mode, the ECU 108 may determine a desired power to be output by the engine 102. The ECU 108 may further determine an upper power threshold and a lower power threshold. The upper power threshold may be a greater power level than the desired power and may correspond to a power level below which the engine 102 remains fuel-efficient. The lower power threshold may be a power level that is less than the desired power and may correspond to a power level above which the engine 102 remains fuel-efficient. For example, the upper power threshold may be 5%, 10%, 20%, or the like greater than the desired power, and the lower power threshold may be 5%, 10%, 20%, or the like less than the desired power.

The ECU 108 may control the engine 102 to constantly output power that is between the upper power threshold and the lower power threshold. Fuel efficiency of the vehicle 100 is greater when the power output by the engine 102 remains relatively constant than when the power output by the engine 102 is constantly increasing or decreasing beyond the upper power threshold and the lower power threshold. In that regard, the vehicle 100 may provide improved fuel efficiency when operating in the constant power mode.

Figure 2:
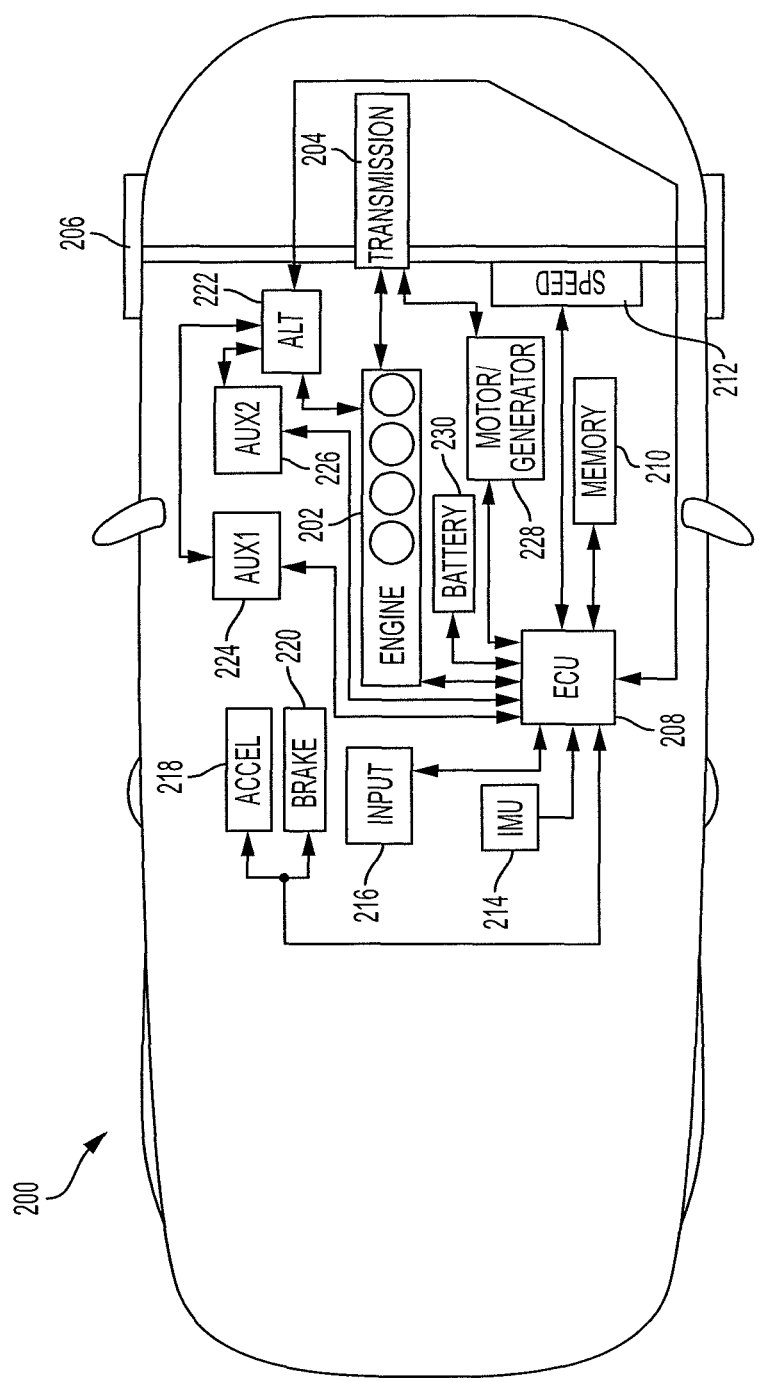
FIG. 2 is a drawing of a hybrid vehicle having various features for operating in a constant power mode to increase fuel efficiency according to an embodiment of the present invention.

Turning now to FIG. 2, another vehicle 200 may include features for providing improved fuel efficiency. The vehicle 200 includes similar features as the vehicle 100. In particular, the vehicle 200 includes an engine 202, a transmission 204, wheels 206, an ECU 208, a memory 210, an IMU 214, an input device 216, an acceleration pedal 218, a brake pedal 220, an alternator 222, and one or more auxiliary component 224, 226.

As opposed to the vehicle 100 that operates based on engine power alone, the vehicle 200 is a hybrid vehicle. In that regard, the vehicle 200 further includes a motor-generator 228 and a battery 230. The battery 230 stores electricity which may be converted by the motor-generator 228 into power. The power from the motor-generator 228 may be combined with the engine 202 to provide power to the wheels 206 via the transmission 204. The motor-generator 228 may further receive mechanical power from the transmission 204 and convert the mechanical power into electricity to be stored in the battery 230.

In some embodiments, the vehicle 200 may not include an alternator 222. In that regard, electricity from the battery 230 may be used to power the auxiliary components 224, 226.

Constant power mode of the vehicle 200 may be performed in a similar manner as the vehicle 100. In some embodiments, the ECU 208 may control the total combined power output by the engine 202 and the motor-generator 228 to remain between an upper power threshold and a lower power threshold. In some embodiments, the ECU 208 may control the power output by the engine 202 to remain between the upper power threshold and the lower power threshold, while allowing the power from the motor-generator 228 to vary.

Figure 3:
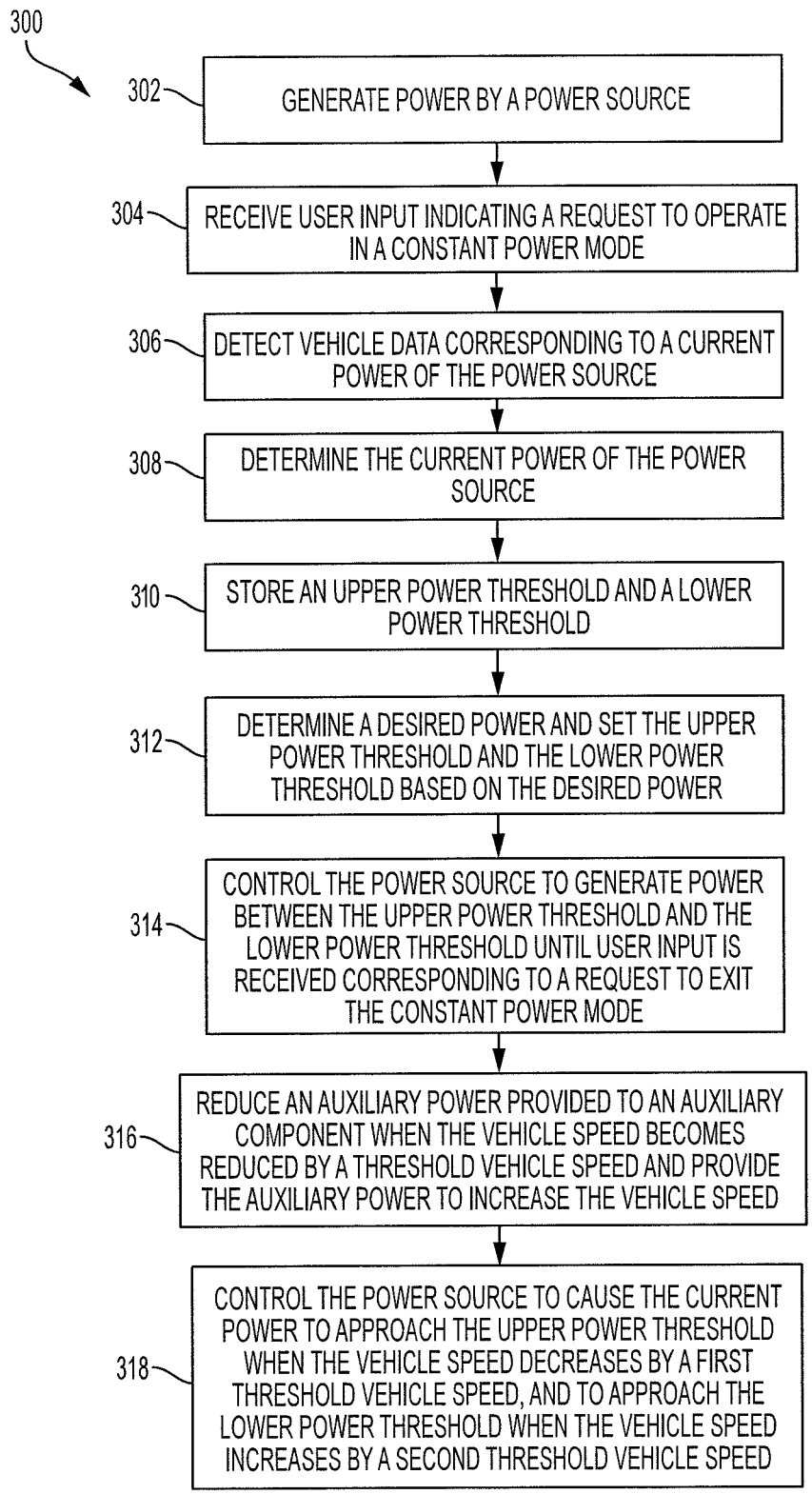
FIG. 3 is a flowchart illustrating a method for controlling a vehicle to operate in a constant power mode to increase fuel efficiency of the vehicle according to an embodiment of the present invention.

Turning now to FIG. 3, a method 300 for improving fuel efficiency of a vehicle is shown. The method 300 may be performed by components of a vehicle such as the vehicle 100 of FIG. 1 or the vehicle 200 of FIG. 2. The method 300 may improve fuel efficiency of the corresponding vehicle by controlling power output of a vehicle when the vehicle is in a constant power mode.

In block 302, a power source of the vehicle may generate power to propel the vehicle forward or afterward. The power source of the vehicle may include at least one of an engine (such as a gasoline engine or a fuel cell engine) or a motor-generator.

In block 304, an ECU may receive user input indicating a request to operate in a constant power mode. The ECU may receive this user input via an input device of the vehicle. For example, a user may have a desire for improved fuel efficiency of the vehicle and may provide an input to the input device requesting the constant power mode.

In some embodiments, a vehicle may be set to always operate in the constant power mode. This feature may be particularly applicable to autonomous vehicles. For example, in an autonomous vehicle, the passengers of the vehicle may not notice relatively slow acceleration resulting from operation in the constant power mode. On the other hand, some vehicle drivers may dislike such relatively slow acceleration.

In some embodiments, an ECU of a vehicle may cause the vehicle to operate in the constant power mode without user input. For example, the vehicle may be an autonomous vehicle or a semi-autonomous vehicle and the ECU may be designed to control the vehicle to operate in the constant power mode at all times in order to provide an optimized balance of comfort, fuel efficiency, travel efficiency, and the like. For example, the ECU may first allow the power source to provide an amount of power greater than the upper power threshold until the speed of the vehicle reaches a predetermined speed (corresponding to a speed between 0 miles per hour (miles per hour) and a cruising speed, in order to allow for a relatively quick acceleration to the cruising speed). The ECU may then control the power source to generate power between the upper power threshold and the lower power threshold.

In block 306, one or more sensor of the vehicle may detect vehicle data. The vehicle data may correspond to a current power generated by the power source. In that regard, the vehicle data may be usable by the ECU to determine the current power generated by the power source. In some embodiments, the vehicle data may include a speed of the vehicle (detected by an IMU or a speed sensor), a grade of a currently traversed road (detected by an IMU), and an acceleration percentage corresponding to a requested amount of acceleration (as detected by an accelerator pedal). In some embodiments, the vehicle data may include an engine and/or motor speed (i.e., angular velocity) along with an amount of torque output by the engine and/or motor. The angular velocity may be detected by an angular velocity sensor. The amount of torque output by the engine and/or motor may be determined by analyzing a driving force map stored in a memory.

In block 308, the ECU may determine the current power being output by the power source. The ECU may make this determination based on the vehicle data detected in block 306. If the vehicle is a hybrid vehicle the ECU may separately determine the current engine power being output by the engine and the current motor power being output by the motor-generator, or may determine a combined power output including the current engine power and the current motor power.

In block 310, an upper power threshold and a lower power threshold may be stored in a memory. In some embodiments, the upper power threshold and the lower power threshold may be set by a vehicle manufacturer and define a range of vehicle power in which fuel efficiency is maximized. In some embodiments, the upper power threshold and the lower power threshold may be set at a later point in time, such as after receipt of a request for the vehicle to operate in the constant power mode. In that regard, the upper power threshold and the lower power threshold may be based on a current power being generated at a time of a request for the vehicle to operate in the constant power mode.

In block 312, the ECU of the vehicle may determine a desired power of the vehicle. The desired power may be a power level at which the power source provides the greatest fuel efficiency. The desired power may also be a power level at which an ideal balance of performance and fuel efficiency is achieved. In some embodiments, the desired power may correspond to a current power of the power source at a time when a driver provides input requesting operation in the constant power mode.

After determining the desired power, the ECU may set the upper power threshold and the lower power threshold based on the desired power. In some embodiments, the ECU may determine the upper power threshold and the lower power threshold instead of determining the desired power. For example, the ECU may set the upper power threshold and the lower power threshold to define a range of powers in which optimum fuel efficiency is achieved, or in which an ideal balance of performance and fuel efficiency is achieved.

In some embodiments, the ECU may set the upper power threshold and the lower power threshold based on the desired power. For example, the ECU may set the upper power threshold to be a percentage, such as 5%, 10%, 20%, or the like, above the desired power. The ECU may also set the lower power threshold to be a percentage, such as 5%, 10%, 20%, or the like, below the desired power.

For example, a driver may request that the vehicle operate in constant power mode at a time in which the engine is outputting 10 kilowatts (10 kW) of power. In that regard, the ECU may set the desired power to be 10 kW. The ECU may set the upper power threshold to be 11 kW (10% greater than the desired power) and may set the lower power threshold to be 9 kW (10% less than the desired power).

In block 314, the ECU may control the power source to generate power between the upper power threshold and the lower power threshold. The ECU may control the power source such that the power constantly remains between the upper power threshold and the lower power threshold. The ECU may control the power source in this manner until input is received that corresponds to a request to exit the constant power mode.

Figure 4:
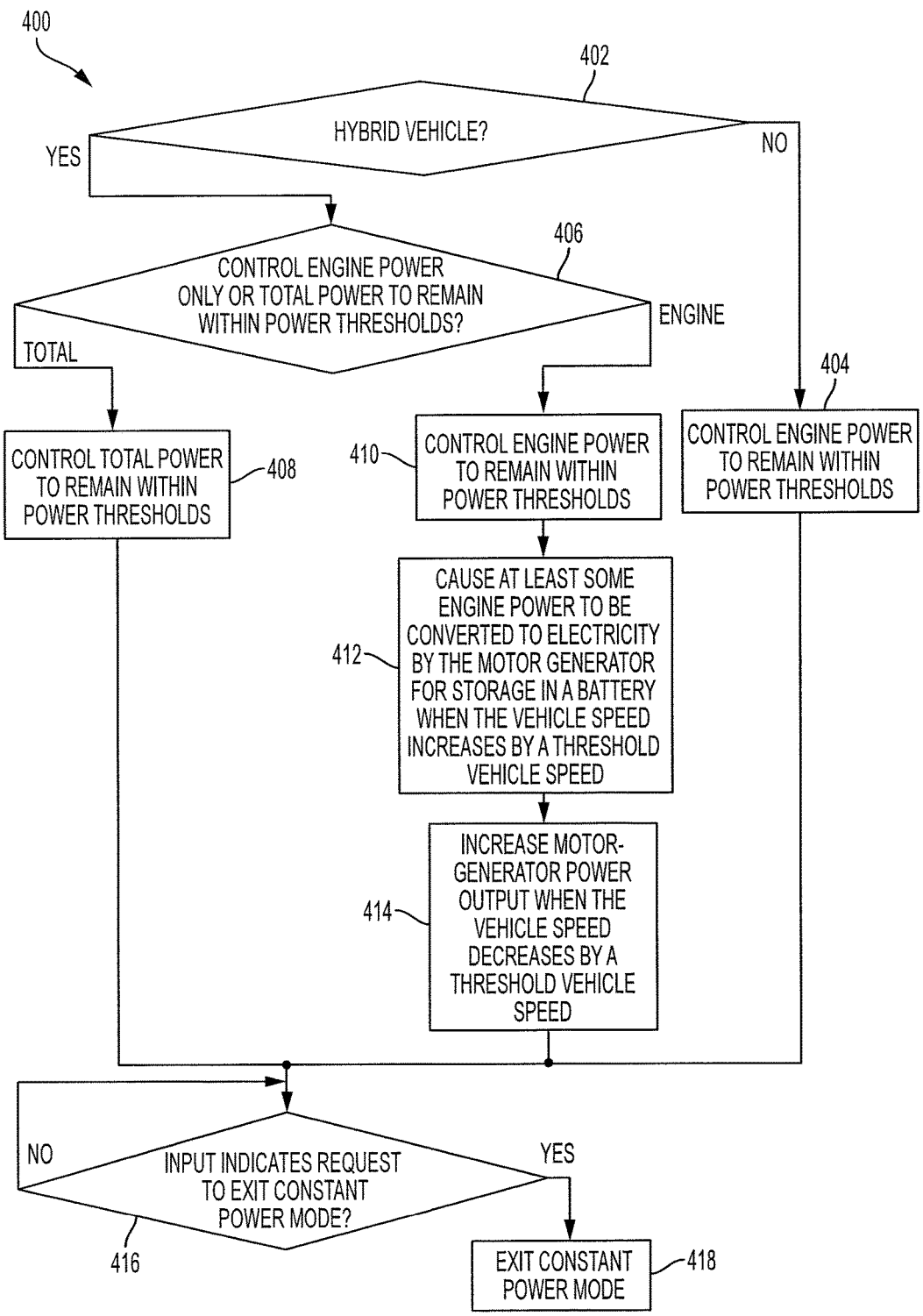
FIG. 4 is a flowchart illustrating a method for controlling a power source to generate power at a constant level according to an embodiment of the present invention.

Referring now to FIG. 4, a method 400 for controlling a power source to generate power between the upper power threshold and a lower power threshold is shown. In block 402, the ECU may determine whether the vehicle is a hybrid vehicle or is not a hybrid vehicle. In some embodiments, the method 300 of FIG. 3 and the method 400 of FIG. 4 may apply to an electric vehicle. However, the methods will be described in reference to a hybrid vehicle or a vehicle having an engine only.

If the ECU determines that the vehicle is not a hybrid vehicle, the ECU may control the engine power of the engine to remain within the upper power threshold and the lower power threshold in block 404.

If the ECU determines that the vehicle is a hybrid vehicle, the method 400 may proceed to block 406. In block 406 the ECU may determine whether the constant power mode is to be applied to the engine power only or to a combination of the engine power and the motor power of the motor-generator. In some embodiments, the ECU may be programmed to always apply constant power mode to the engine or to the combination of the engine and the motor-generator. In that regard, the automobile manufacturer may make a design preference as to whether to apply constant power mode to the engine only or to the combination of the engine and the motor-generator.

If constant power mode is to be applied to the total power corresponding to the combination of the engine and the motor-generator, the method 400 may proceed to block 408. In block 408, the ECU may control the engine and the motor-generator to output power such that the total power remains below the upper power threshold and above the lower power threshold.

In some embodiments, the ECU may control the engine power to remain below an upper engine power threshold and above a lower engine power threshold, and may control the motor-generator to remain below an upper motor power threshold and above a lower motor power threshold. In some embodiments, the engine power and the motor power may vary so long as the total power remains within the upper power threshold and the lower power threshold.

If the ECU is to control only the engine power to remain within the upper power threshold and the lower power threshold, the ECU may control the engine to do so in block 410. In some embodiments, the motor-generator may output any amount of motor power so long as the engine power remains within the upper power threshold and the lower power threshold.

In some embodiments, it may be desirable for the vehicle speed to remain relatively constant during constant power mode. In that regard, the motor-generator may absorb or supplement the engine power based on a driving environment. For example, the vehicle speed may increase as the vehicle is traveling downhill and the vehicle speed may decrease as the vehicle is traveling uphill. In some embodiments, the motor-generator may be used to absorb extra power when a vehicle speed increases to or above an upper threshold vehicle speed, or to provide additional power when the vehicle speed decreases to or below a lower threshold vehicle speed.

In that regard and in block 412, the ECU may cause at least some of the engine power to be absorbed by the motor-generator when the vehicle speed increases to an upper threshold vehicle speed. The upper threshold vehicle speed may correspond to a speed great enough to alarm the driver or to present a hazard. In some embodiments, the upper threshold vehicle speed may be based on a current desirable speed. The current desirable speed may be set by a user, may correspond to a speed limit, may be determined by the ECU to correspond to an average vehicle speed on a current road segment, or the like. In that regard, the upper threshold vehicle speed may correspond to a predetermined speed, such as 5 mph or 10 mph, over the current desirable speed. In some embodiments, the upper threshold vehicle speed may correspond to a percentage, such as 5%, 10%, or 20%, above an average vehicle speed or other speed.

When the vehicle speed increases to or above the upper threshold vehicle speed, the ECU may control at least some of the power output by the engine to be transferred to the motor-generator. The motor-generator may then convert the received power into electricity for storage in the battery. The transfer of this power to the motor-generator reduces the amount of power applied to the wheels, thus potentially reducing the vehicle speed while allowing the power to remain relatively constant. In some embodiments, the ECU may control the motor-generator to convert a sufficient amount of power to cause the vehicle speed to reach a speed less than or equal to the upper threshold vehicle speed and, in some embodiments, the ECU may control the motor-generator to convert a sufficient amount of power to cause the vehicle speed to reach the current desirable speed or the average speed.

If the vehicle speed is not sufficiently reduced (i.e., the vehicle speed remains above the upper threshold vehicle speed), the ECU may control at least some of the power to be distributed to auxiliary vehicle components such as a climate control unit, an entertainment system, or the like. If the vehicle speed is still not sufficiently reduced the ECU may make a decision to reduce the engine power below the lower power threshold and/or may control brakes of the vehicle to reduce the vehicle speed.

In block 414, the ECU may control the motor-generator to increase a motor power when the vehicle speed decreases to or below a lower threshold vehicle speed. The lower threshold vehicle speed may correspond to a speed sufficiently low as to be unpleasant to a driver or passenger, or sufficiently low as to disrupt traffic. As with the upper threshold vehicle speed, the lower threshold vehicle speed may be based on a current desirable speed or on an average speed.

When the vehicle speed decreases to or below the lower threshold vehicle speed, the ECU may control the motor-generator to generate additional power. In some embodiments, the ECU may control the motor-generator to generate a sufficient amount of power to cause the vehicle speed to reach or exceed the lower threshold vehicle speed. In some embodiments, the ECU may control the motor-generator to generate a sufficient amount of power to cause the vehicle speed to reach or exceed the average vehicle speed or the current desirable speed.

In block 416, the ECU may determine whether input has been received that indicates a request to exit the constant power mode. The input may be received from any of a number of sources. For example, the input may be received from the input device and indicate a request to cancel the constant power mode. In that regard, the ECU may control the vehicle to cease operating in the constant power mode until input has again been received corresponding to a request to operate in the constant power mode.

In some embodiments, the input may be received from an accelerator pedal or a brake pedal. The ECU may control the vehicle to cease operating in the constant power mode in response to a depression of the accelerator pedal or the brake pedal. In some embodiments, the ECU may control the vehicle to again operate in the constant power mode after the accelerator pedal or the brake pedal has been released. In some embodiments, the ECU may control the vehicle to cease operating in the constant power mode until input has been received corresponding to a request to again operate in the constant power mode.

In block 418, the ECU may control the vehicle to exit the constant power mode if the user input indicates the request to exit the constant power mode.

Returning to FIG. 3, additional actions may be taken when the vehicle speed decreases beyond the lower threshold vehicle speed. In particular, in block 316, the ECU may reduce an amount of auxiliary power provided to one or more auxiliary component when the vehicle speed becomes reduced to or below the lower threshold vehicle speed. The ECU may then cause the auxiliary power to be applied to the wheels instead of the auxiliary component in order to increase the vehicle speed.

Conversely, if the vehicle speed increases beyond the upper threshold vehicle speed, the ECU may cause some of the engine power or motor power to be transferred to one or more auxiliary component. Such transfer may reduce an amount of power applied to the wheels, thus reducing the vehicle speed.

Some auxiliary components may be considered essential auxiliary components and some may be considered nonessential auxiliary components. In that regard, the ECU may adjust the amount of power provided to nonessential auxiliary components and may not adjust the amount of power provided to essential auxiliary components. Essential auxiliary components may correspond to components without which driver comfort or vehicle safety may be significantly compromised. Nonessential auxiliary components may correspond to components without which driver comfort or vehicle safety may not be significantly compromised. For example, heated seats may be regarded as a nonessential auxiliary component because a lack of heated seats may not significantly affect driver comfort or vehicle safety. On the other hand, a lane departure assistance component (such as a proximity sensor) may be regarded as an essential auxiliary component because a lack of lane departure assistance may compromise vehicle safety.

Still other components may be regarded as partially essential, such as climate control. In that regard, the ECU may partially adjust settings of a climate control component. For example, if additional power is desired to increase vehicle speed, the ECU may reduce, but not eliminate, an amount of power provided to an air conditioner such that the vehicle speed may increase and the driver comfort may not be significantly affected.

In some embodiments, the ECU may control, the power generated by the power source to increase or decrease within the upper power threshold and the lower power threshold.

In that regard, in block 318, the ECU may control the power source such that the power approaches the upper power threshold when the vehicle speed decreases to or below the lower threshold vehicle speed. Likewise, the ECU may control the power source such that the power approaches the lower power threshold when the vehicle speed increases to or above the upper threshold vehicle speed.

By controlling the power source in this manner, the power source may remain relatively fuel-efficient (because the power remains between the upper power threshold and the lower power threshold) and the vehicle speed may remain relatively constant.

Figure 5:
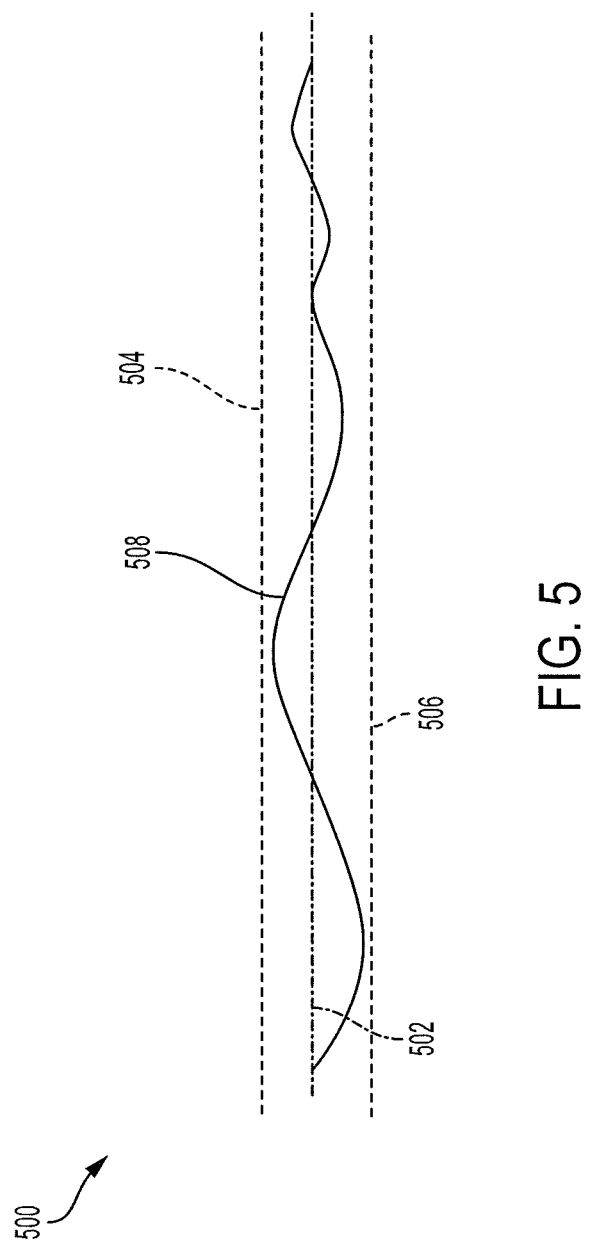
FIG. 5 is a chart illustrating operation of a vehicle in a constant power mode according to an embodiment of the present invention.

Turning now to FIG. 5, a chart 500 illustrates vehicle power 508 when the vehicle is operating in constant power mode. FIG. 5 illustrates a desired power 502 along with an upper power threshold 504 above the desired power 502 and a lower power threshold 506 below the desired power 502. As shown, the vehicle power 508 may fluctuate between the upper power threshold 504 and the lower power threshold 506 yet remain less than the upper power threshold 504 and greater than the lower power threshold 506.

Figure 6:
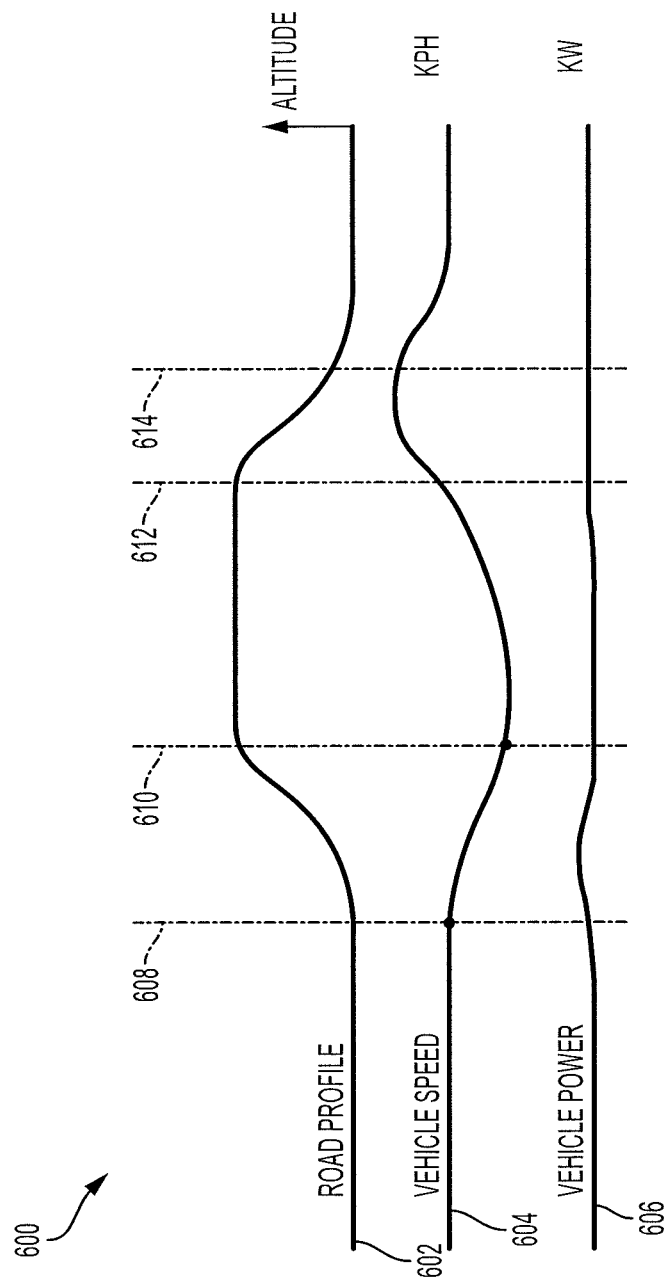
FIG. 6 is a chart illustrating operation of a vehicle in a constant power mode while traveling along a straight portion of a road, an uphill portion of the road, and a downhill portion of the road according to an embodiment of the present invention.

Turning now to FIG. 6, another chart 600 illustrates operation of the vehicle in constant power mode as the vehicle traverses a hill. The chart 600 shows a road profile, a vehicle speed 604, and a vehicle power 606 over a distance. As shown, the road profile 602 is relatively flat until a first location 608. In that regard, the vehicle speed 604 and the vehicle power 606 further remain relatively stable.

Between the first location 608 and a second location 610, the road profile 602 may increase, corresponding to a hill. As the vehicle begins traversing the hill, the vehicle power 606 may slightly increase but may remain within an upper power threshold. In that regard, the slope of the hill may be sufficiently great that the vehicle speed 604 begins to decrease.

Some drivers may be unhappy with the reduced speed traveling up the hill. In that regard, the driver may request additional acceleration using the accelerator pedal. Looking back, when the driver initialized the constant power mode, the accelerator pedal position may have been set to a first position, such as a 40 percent depression. However, without changing the vehicle configuration, the vehicle may require a greater accelerator pedal depression (i.e., greater than 40 percent) to achieve any increase in power while traveling up the hill. Such a difference may be undesirable by the driver.

In that regard, in response to a requested power increase, the ECU of the vehicle may reassign drive force values to reduce a disconnect between the first pedal position and a greater required pedal position to achieve an increased power. In particular, the ECU may adjust the drive force values of the vehicle such that a depression of the accelerator pedal that corresponds to the first position (i.e., the 40 percent depression) will provide the same or greater power than is currently provided. This reduces the need for the driver to apply greater pressure to the pedal than when the constant power mode was set.

However, it may be desirable to eventually return the drive force values to their original settings. In that regard, the ECU may start a timer (such as 5 seconds, 10 seconds, or the like) after adjusting the drive force values. After expiration of the timer, the ECU may cause the drive force values to gradually return to their original settings. For example, after expiration of the timer, the ECU may gradually cause the drive force values to return to their initial settings prior to the additional power request by the driver. The drive force values may return to their initial settings after 5 seconds, 10 seconds, or the like after expiration of the timer.

Between the second location 610 and a third location 612, the road profile 602 becomes relatively flat again. Because the vehicle power 606 continues to remain constant, the vehicle speed 604 may begin to increase between the second location 610 and the third location 612.

At the third location 612, the road profile 602 becomes sloped again, corresponding to a downhill portion of the road. In that regard, the vehicle power 606 may reduce slightly but may remain above the lower power threshold. Accordingly, the vehicle speed 604 may increase at a relatively fast rate.

After the fourth location 614, the road profile 602 again becomes flat. As with the other road segments, the vehicle power 606 remains relatively constant, above the lower power threshold and below the upper power threshold. Accordingly, the vehicle speed 604 may gradually decrease until it approaches a constant vehicle speed.

Figure 7:
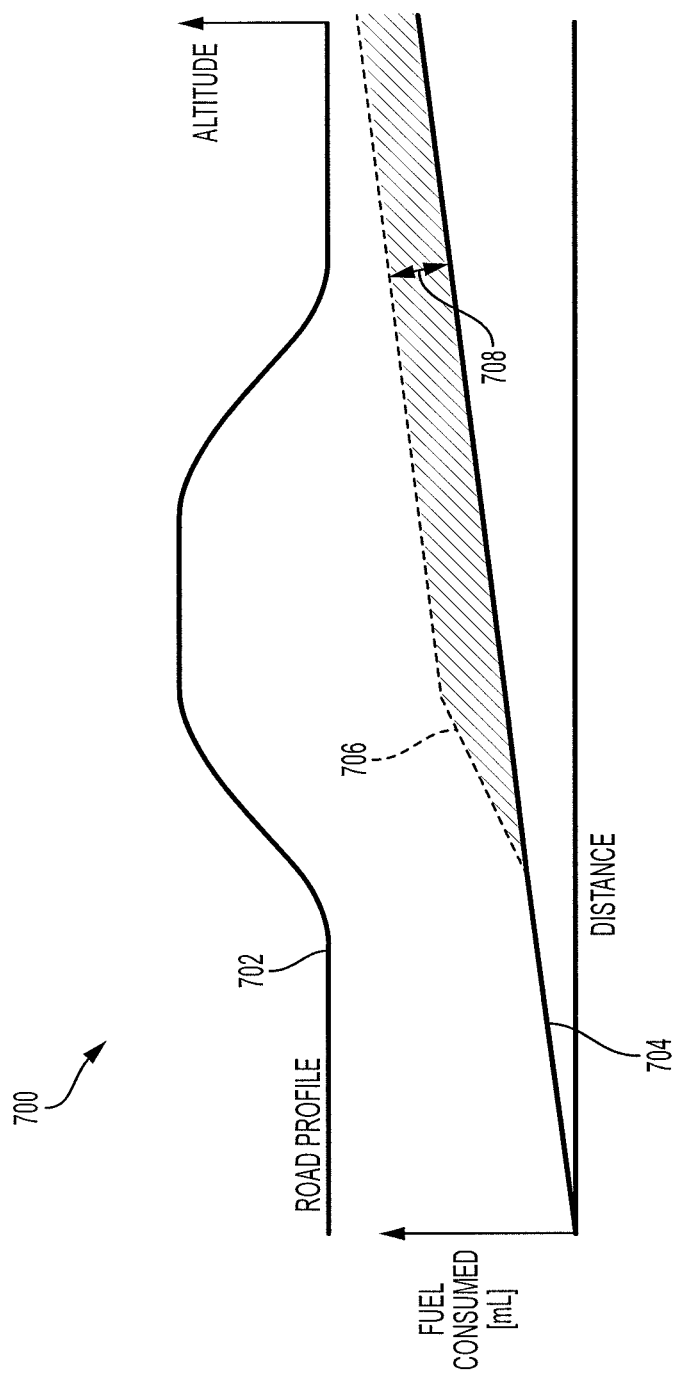
FIG. 7 is a chart illustrating fuel efficiency benefits of a vehicle operating in constant power mode relative to a vehicle operating in a cruise control mode according to an embodiment of the present invention.

Turning now to FIG. 7, a chart 700 illustrates the benefits of the constant power control relative to cruise control. A first line 702 corresponds to a road profile of a road having an uphill portion, a downhill portion, and various flat portions. A line 704 corresponds to fuel consumption of a vehicle in a constant power mode, and a line 706 corresponds to fuel consumption of a vehicle in a cruise control mode. As shown, the fuel consumption may remain relatively constant when the road profile is flat. However, as the vehicle begins traveling uphill, the power generated by the cruise control may significantly increase, thus increasing the fuel consumption of the cruise control vehicle. On the other hand, the power control vehicle continues to output a constant amount of power, causing the fuel consumption to remain relatively constant.

Similarly, when the vehicle begins traveling downhill, the cruise control vehicle may significantly reduce or eliminate vehicle power. At the same time, the constant power vehicle may continue to output a constant power. In that regard, the fuel consumption of the constant power vehicle may remain relatively less than the fuel consumption of the cruise control vehicle. As shown, the power control vehicle may have a fuel consumption that is less than the fuel consumption of the cruise control vehicle by a difference 708.

Figure 8:
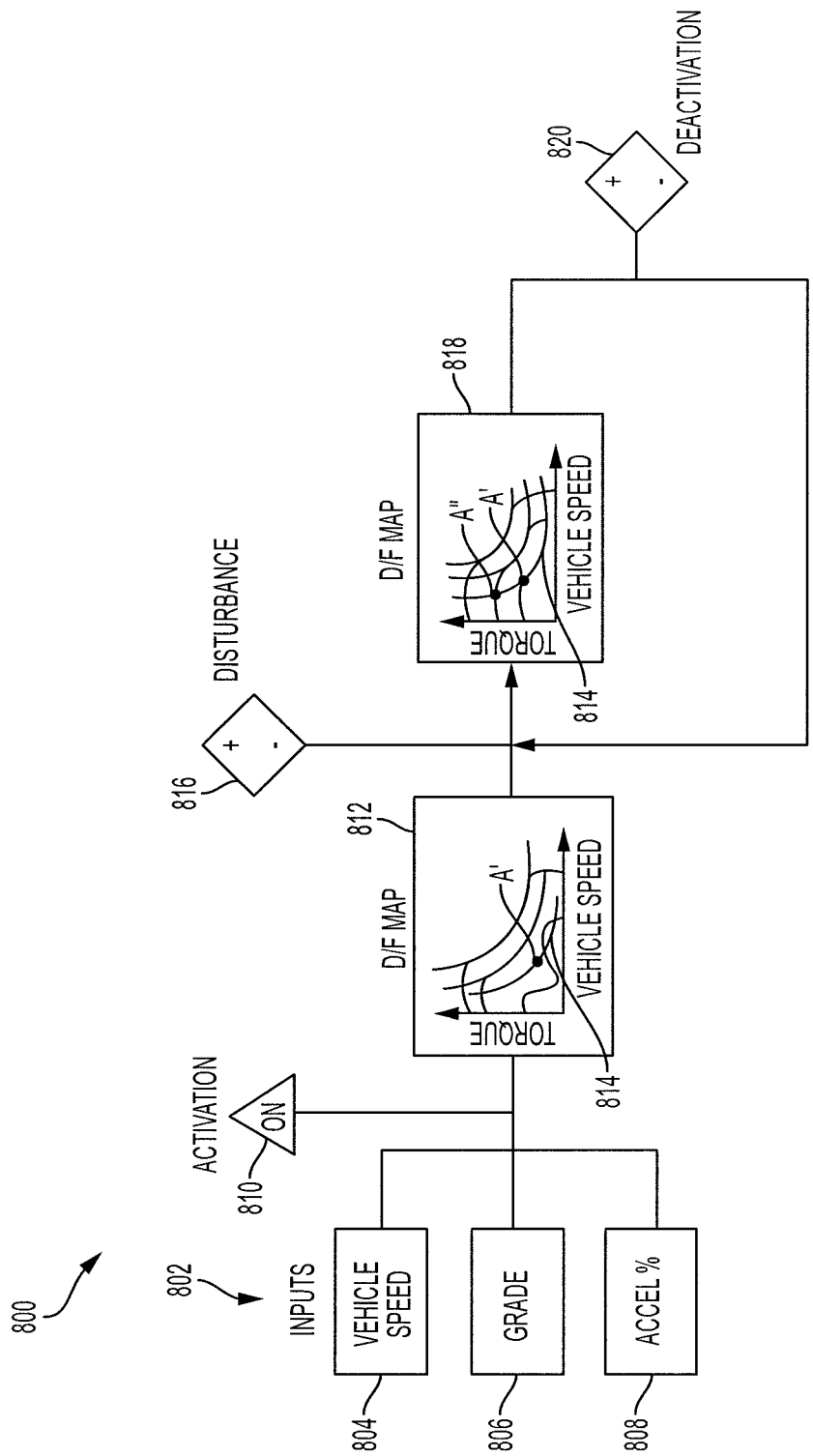
FIG. 8 is a functional diagram illustrating operation of a vehicle having a constant power mode according to an embodiment of the present invention.

Turning now to FIG. 8, a functional diagram 800 provides another illustration of operation of constant power mode. A vehicle may include inputs 802 including a vehicle speed 804, a road grade 806, and an acceleration percent 808. The combination of inputs 802 may be used to determine a current vehicle power.

At a point in time, an activation 810 may indicate a desire for the vehicle to operate in constant power mode. For example, the activation 810 may correspond to a depression of a button associated with the constant power mode. As another example, the activation 810 may correspond to a determination by an ECU that the fuel consumption of the vehicle is relatively high and thus the vehicle should operate in the constant power mode.

A drive force map 812 may indicate that the vehicle is operating at a current setting of A'. The drive force map 812 may have a Y axis corresponding to a torque output by a power source and an X axis corresponding to a vehicle speed. The drive force map 812 may further illustrate a plurality of power curves including a power curve 814. All locations along the power curve 814 correspond to the same power output. The A' setting is located along the first power curve 814.

At a later point in time, a disturbance 816 may occur. The disturbance may include, for example, a change in road material (such as a change from pavement to gravel), an incline, a decline, or the like. In response to the disturbance 816, the settings of the vehicle may change as shown by another drive force map 818. Because the vehicle is operating in constant power mode, the vehicle may continue to operate along the first power curve 814. However, due to the disturbance, the torque and/or vehicle speed may change. In that regard, after the disturbance 816, the vehicle may operate at a new setting of A". As illustrated, the new setting A" is located along the first power curve 814 yet corresponds to a lower vehicle speed and a greater torque.

The vehicle may continue to operate in this fashion until a deactivation 820 is detected. The deactivation 820 may correspond to a request for the vehicle to exit constant power mode. For example, the deactivation 820 may correspond to a depression of a brake pedal or an accelerator pedal, a depression of a button indicating a request to stop operating in constant power mode, a decision by the ECU to stop operating in constant power mode, or the like.

Referring now to FIGS. 9A and 9B, an illustration of adjusting auxiliary power to affect vehicle speed is shown. In FIG. 9A, the road may have a grade of approximately 0%. In that regard, vehicle power may be provided as driving power 900, essential auxiliary component power 902, and non-essential auxiliary component power 904.

In FIG. 9B, the road may have a grade of approximately 10%. In that regard, the speed of the vehicle may initially decrease below a lower threshold vehicle speed. In response to this decrease in vehicle speed, the ECU may control the non-essential accessory power 904 to be applied as driving power 920. Thus, in FIG. 9B, the vehicle power is distributed only as driving power 920 and essential auxiliary component power 922. Thus, the additional power provided as driving power 920 is sufficiently great to cause the vehicle speed to remain the same as the vehicle speed on the straight road of FIG. 9A.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for increasing fuel efficiency of a vehicle comprising:
    a power source configured to convert a fuel into power;
    an input device configured to receive user input corresponding to a request to operate in a constant power mode;
    at least one sensor configured to detect vehicle data corresponding to a current power of the power source;
    a memory configured to store an upper power threshold and a lower power threshold;
    a speed sensor configured to detect a vehicle speed;
    an auxiliary component configured to utilize at least some of the power from the power source to generate an output; and
    an electronic control unit (ECU) coupled to the power source, the input device, the at least one sensor, the speed sensor, and the memory and configured to:
        determine the current power of the power source based on the detected vehicle data,
        control the power source such that the current power remains between the upper power threshold and the lower power threshold when the user input corresponds to the request to operate in the constant power mode, and
        reduce or eliminate the power provided to the auxiliary component to allow the reduced or eliminated power to be used to increase the vehicle speed when the vehicle speed becomes reduced to or, below a lower threshold vehicle speed.

2. The system of claim 1 wherein the ECU is further configured to determine a desired power corresponding to the power of the power source when the input device receives the user input corresponding to the request to operate in the constant power mode and to set the upper power threshold and the lower power threshold based on the desired power.

3. The system of claim 1 wherein the detected vehicle data includes the vehicle speed, a grade of a currently-traversed road, and an acceleration percentage.

4. The system of claim 1 further comprising a brake pedal configured to receive a braking request and an accelerator pedal configured to receive an acceleration request and wherein the ECU is further configured to allow the power of the power source to exceed the upper power threshold or drop below the lower power threshold while the brake pedal receives the braking request or the accelerator pedal receives the acceleration request.

5. The system of claim 1 wherein the power source, the input device, the at least one sensor, the memory, and the ECU are configured to be incorporated into an autonomous vehicle and the ECU is further configured to determine the upper power threshold and the lower power threshold based on characteristics of the power source in order to optimize the fuel efficiency of the autonomous vehicle.

6. The system of claim 1 wherein the ECU is further configured to control the power source such that the current power approaches the upper power threshold when the vehicle speed decreases to or below the lower threshold vehicle speed and such that the current power approaches the lower power threshold when the vehicle speed increases to or above an upper threshold vehicle speed.

7. The system of claim 1 further comprising a battery configured to store electricity and wherein the power source includes an engine configured to convert the fuel to the power and a motor-generator configured to convert the electricity from the battery to additional power, and the ECU is further configured to at least one of:
    control the power source such that a total current power remains between the upper power threshold and the lower power threshold, the total current power including the current power from the engine and a current additional power from the motor-generator; or
    control the power source such that the current power from the engine remains between the upper power threshold and the lower power threshold regardless of the current additional power from the motor-generator.

8. The system of claim 1 further comprising:
    a battery configured to store electricity; and
    a motor-generator coupled to the battery and configured to convert received power into the electricity;
    wherein the ECU is further configured to cause at least some of the current power generated by the power source to be converted into the electricity by the motor-generator when the vehicle speed increases to or above an upper threshold vehicle speed.

9. A system for increasing fuel efficiency of a vehicle comprising:
    an engine configured to convert a fuel into engine power;
    a battery configured to store electrical energy;
    a motor-generator coupled to the battery and configured to convert the electrical energy into motor power;
    an input device configured to receive user input corresponding to a request to operate in a constant power mode;
    at least one sensor configured to detect vehicle data corresponding to a current engine power of the engine;
    a memory configured to store an upper engine power threshold and a lower engine power threshold;
    a speed sensor configured to detect a vehicle speed;
    an auxiliary component configured to utilize at least some of the engine power to generate an output; and
    an electronic control unit (ECU) coupled to the engine, the motor-generator, the input device, the at least one sensor, and the memory and configured to:
        determine the current engine power based on the detected vehicle data,
        control the engine such that the current engine power remains between the upper engine power threshold and the lower engine power threshold when the user input corresponds to the request to operate in the constant power mode, and
        reduce or eliminate the engine power provided to the auxiliary component to allow the reduced or eliminated engine power to be used to increase the vehicle speed when the vehicle speed becomes reduced to or below a lower threshold vehicle speed.

10. The system of claim 9 wherein the ECU is further configured to determine a desired engine power corresponding to the engine power when the input device receives the user input corresponding to the request to operate in the constant power mode and to set the upper engine power threshold and the lower engine power threshold based on the desired engine power.

11. The system of claim 9 wherein the ECU is further configured to control the motor-generator to increase the motor power when the vehicle speed becomes reduced to or below the lower threshold vehicle speed.

12. The system of claim 9 wherein the ECU is further configured to control the motor-generator to convert at least some of the engine power into the electrical energy to be stored in the battery when the vehicle speed increases to or above an upper threshold vehicle speed.

13. The system of claim 9 wherein the engine, the battery, the motor-generator, the input device, the at least one sensor, the memory, and the ECU are configured to be incorporated into an autonomous vehicle and the ECU is further configured to determine the upper engine power threshold and the lower engine power threshold based on characteristics of the engine in order to optimize the fuel efficiency of the autonomous vehicle.

14. A method for increasing fuel efficiency of a vehicle comprising:
converting, by a power source, a fuel into power;
receiving, by an input device, user input corresponding to a request to operate in a constant power mode;
detecting, by at least one sensor, vehicle data corresponding to a current power of the power source;
storing, in a memory, an upper power threshold and a lower power threshold;
determining, by an electronic control unit (ECU), the current power of the power source based on the detected vehicle data;
controlling, by the ECU, the power source to generate power between the upper power threshold and the lower power threshold when the user input corresponds to the request to operate in the constant power mode;
detecting, by a speed sensor, a vehicle speed; and
reducing or eliminating, by the ECU, an auxiliary power provided to an auxiliary component when the vehicle speed becomes reduced to or below a lower threshold vehicle speed such that the auxiliary power is used to increase the vehicle speed.

15. The method of claim 14 further comprising allowing, by the ECU, the current power of the power source to exceed the upper power threshold or drop below the lower power threshold when a brake pedal receives a braking request or an accelerator pedal receives an acceleration request.

16. The method of claim 14 further comprising:
controlling, by the ECU, the power source to cause the current power to approach the upper power threshold when the vehicle speed decreases to or below the lower threshold vehicle speed; and
controlling, by the ECU, the power source to cause the current power to approach the lower power threshold when the vehicle speed increases to or above an upper threshold vehicle speed.

17. The method of claim 14 wherein detecting the vehicle data includes detecting a vehicle speed, a grade of a currently-traversed road, and an acceleration percentage.

* * * * *